June 19, 1956 C. S. SCHROEDER 2,751,255
WHEEL ASSEMBLY
Filed July 24, 1951 2 Sheets-Sheet 1

INVENTOR
C. S. Schroeder
BY
H. H. Golden
ATTORNEY

June 19, 1956 C. S. SCHROEDER 2,751,255
WHEEL ASSEMBLY
Filed July 24, 1951 2 Sheets-Sheet 2

INVENTOR
C. S. Schroeder
BY
A. H. Golden
ATTORNEY

United States Patent Office 2,751,255
Patented June 19, 1956

2,751,255

WHEEL ASSEMBLY

Charles S. Schroeder, Philadelphia, Pa., assignor to The Yale & Towne Manufacturing Company, Stamford, Conn., a corporation of Connecticut Application July 24, 1951, Serial No. 238,213

1 Claim. (Cl. 301—1)

This invention relates to load carrying wheels for industrial trucks and other heavy duty vehicles, and more particularly to a wheel assembly that is especially adapted to serve as a demountable drive wheel upon the driving axle of a truck.

In certain installations, some difficulty has been encountered in the maintenance of industrial truck wheels, particularly in the case of the drive wheels, because these wheels are necessarily of rugged construction and relatively inaccessible and it has heretofore been a time consuming operation to remove them or the tires with which they are provided. The tires must in time be replaced because of wear, and in some cases can be removed from and applied to the wheel only by the use of a hydraulic press after the wheel has first been removed from the axle. Also, in wheels of this class, a loose condition tends to develop between the wheel and the driving axle and must eventually be corrected. This loose condition is the outgrowth of a small initial clearance that is likely to exist despite the careful fitting of the wheel to the axle, and becomes gradually worse through wear under the heavy loads carried, thus causing movement that results in still more wear. It is the purpose of my invention to provide a novel wheel assembly whereby the wheel may be very easily assembled and disassembled relatively to both the tire and the axle, and when assembled will be bound securely to the axle, thereby avoiding the described difficulty in maintaining wheels of this general class.

As one feature of the invention, my novel wheel assembly has means that exerts simultaneous radial forces outwardly against the inner surface of the tire rim or tire band and inwardly against the axle, these forces being effective to bind the assembly, including the tire rim, securely into a single unit with the axle. The means that exerts these forces is in the form of a plurality of members, preferably a pair of wheel discs, so constructed as to be wedged within the tire rim when drawn toward each other or moved relatively to the axle, the reaction of the tire rim or band in confining these wheel members then causing the wheel members to grip the axle.

As another feature of my invention, I provide a particular arrangement whereby a very simple operation of the binding means will be effective to bind the tire rim securely into place in the assembly, or alternatively to release the rim completely from the assembly. Through this arrangement, the removal of the tire may be very easily accomplished whether the tire be of the cushion type or of the demountable type, and no hydraulic press or other special tools will be required for the operation.

I have thus outlined rather broadly the more important features of my invention in order that the detailed description thereof that follows may be better understood, and in order that my contribution to the art may be better appreciated. There are, of course, additional features of my invention that will be described hereinafter, and which will form the subject of the claim appended hereto. Those skilled in the art will appreciate that the conception on which my disclosure is based may readily be utilized as a basis for the designing of other structures for carrying out the several purposes of my invention. It is important, therefore, that the claim to be granted me shall be of sufficient breadth to prevent the appropriation of my invention by those skilled in the art.

Referring now to the drawing.

Figure 3:
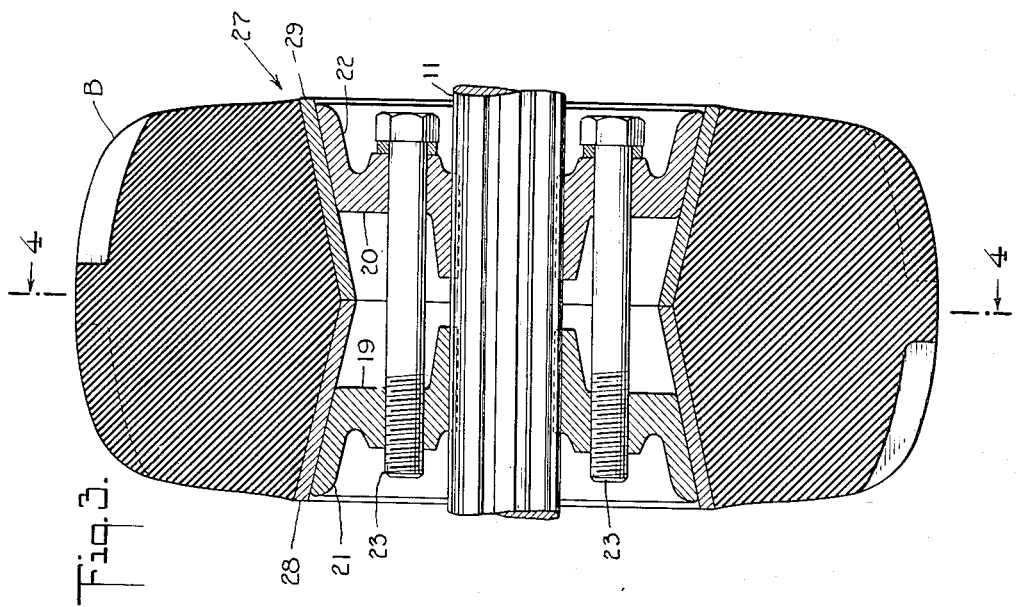
Fig. 3 is a cross-sectional view showing my novel wheel assembly adapted for the mounting of a demountable tire.
Figure 1:
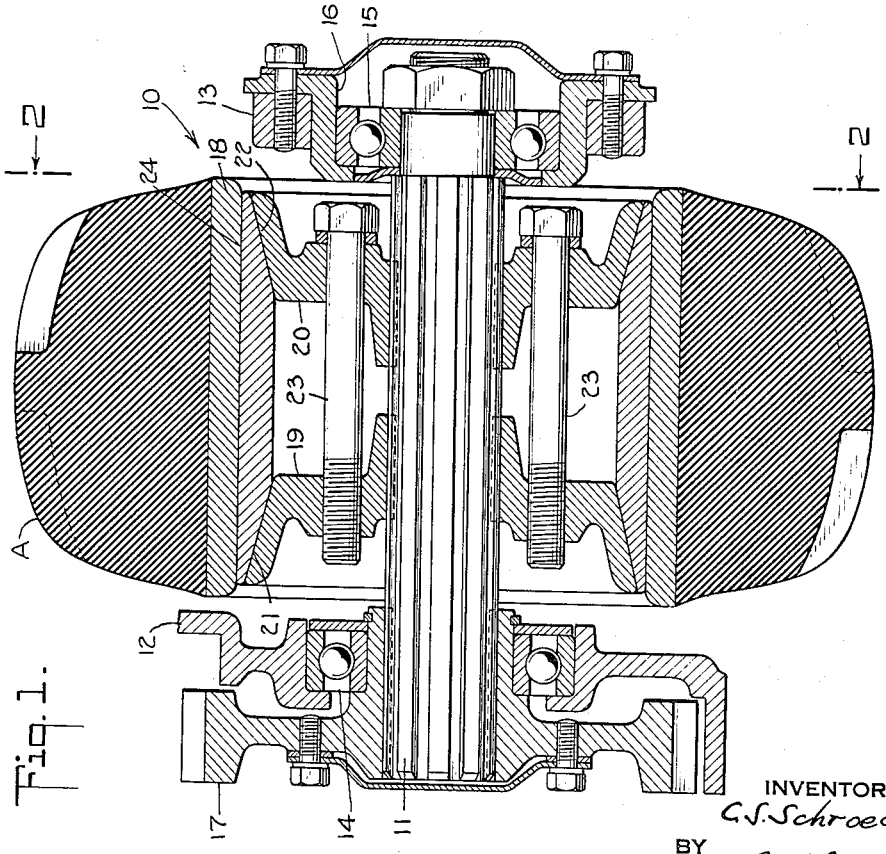
Fig. 1 is a cross-sectional view showing one form of my improved wheel assembly as it would appear in position upon the driving axle of a truck.

In the drawing, one form of my novel wheel assembly, indicated generally by the numeral 10, is shown assembled upon a driving axle 11 journalled in spaced frame members 12, 13, of a truck through bearings 14, 15. My invention is adapted for use in substantially any wheeled truck, and it will therefore be understood that the constructional features of the truck and the details whereby the driving axle 11 is mounted are not of great importance to a description of the invention. However, it will be well to note at this point that I have chosen to illustrate, in order to make more fully apparent the unique advantages obtained in the operation of the invention, a known construction in which the truck frame members 12, 13, are located closely adjacent opposite sides of the wheel, and in which the axle 11 is removed longitudinally to permit removal of the wheel from the truck. Thus, in the example illustrated, the bearing 15 at one end of the axle is carried in a cup-shaped retainer 16 that is detachable from the frame member 13, and when this retainer is detached and the wheel loosened on the axle, the other end of the axle may be slid out of the splined driving gear 17 that carries it in the bearing 14. The axle 11 may then be slid entirely out of the wheel which will be thus released, as will be well understood by those conversant with the art.

Heretofore, the art has resorted to various expedients for securing wheels of this general class to the axle and also for securing the tire to the wheel, but for the reasons described these expedients have not been as satisfactory as might be desired. By my invention, which is embodied in one form in the wheel assembly 10, I have now successfully overcome the objectionable features of prior wheels of this class and have introduced advantages that were not possessed by the prior wheels.

As an important part of the invention, the wheel assembly 10 includes spaced wheel members that bear directly on the driving axle 11, and that exert binding forces radially outward whereby to bind the rim or band 18 of a tire A in a predetermined relationship to the axle 11. These wheel members are preferably in the form of a pair of wheel discs 19, 20, that are bored to receive and to be held aligned by the axle 11 and, particularly where the axle is a driving axle as in the present example, the wheel discs are splined to the axle and exert binding forces also radially inward upon it.

Figure 2:
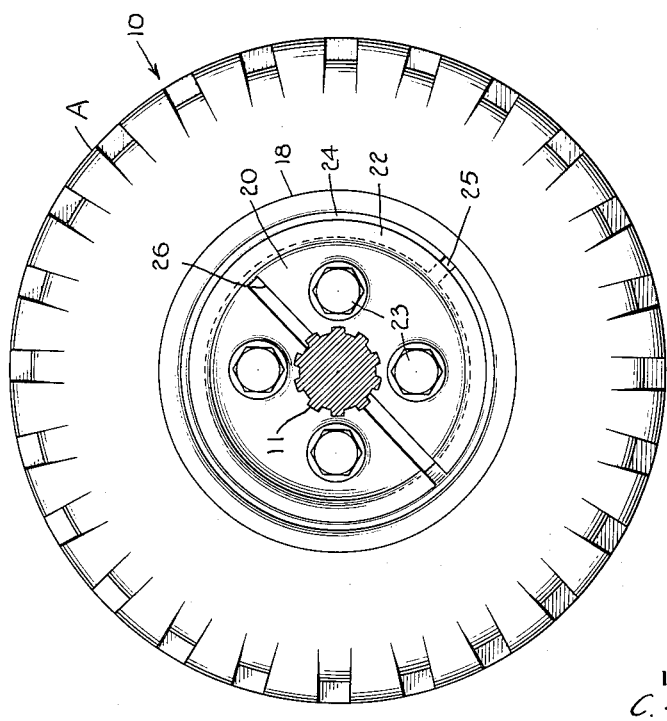
Fig. 2 is a side view of the wheel assembly as it would appear from the line 2—2 of Fig. 1.

The binding action of the wheel members, or discs, 19, 20, is obtained through outwardly inclined flanges 21, 22, that are formed on the peripheries of the discs, and that produce an outward wedging effect when the discs are drawn toward each other by bolts 23 engaged through the discs. The inclined flanges 21, 22, are located entirely within the limits of the tire rim 18, however, and since the inner surface that is presented by this rim is cylindrical and does not itself present wedging surfaces that would be complemental to the surfaces of the inclined flanges 21, 22, I provide a sleeve 24 that presents such complemental surfaces to the inclined flanges and that is located intermediate the tire rim 18 and the flanges 21, 22. The sleeve 24 is not continuous, but is split at one side as indicated at 25 in Fig. 2, thus rendering the sleeve expansible so that the wedging action of the wheel discs 19, 20, will be fully effective to expand the sleeve against the inner surface of the rim 18, thereby to bind the rim and the tire A thereon securely into place in the assembly. The split sleeve 24 is initially formed to have a diameter smaller than the inner diameter of the rim 18 when released from the wedging action, and therefore provides for easy removal and application of the rim, as will be described.

Since it is desired to bind the wheel discs 19, 20, also to the driving axle 11, the wedging action of the flanges 21, 22, is utilized for this purpose and each of the discs 19, 20, is formed with a diametral slot 26 intersecting the bore thereof (Fig. 2), whereby these discs are compressible in a radial direction. Thus, when the wheel discs 19, 20, are drawn toward each other upon the axle by the bolts 23, the resulting wedging action will not only bind the tire rim 18 into the assembly, but will be confined by the reaction of this rim so that the wheel discs will be compressed to produce a very strong gripping action upon the driving axle 11.

It will be understood that the bores in the wheel discs 19, 20, will be so formed as to provide a clearance that will be sufficient to permit the axle 11 to be easily inserted therethrough when the discs are in an uncompressed condition. After the wheel has been loosely assembled and placed approximately in its installed position between the frame members 12, 13, of the truck, the driving axle 11 may therefore be easily inserted through the frame member 13, the wheel discs 19, 20, and into the driving gear 17. After the axle 11 has been thus inserted, the bearing retainer 16 will, of course, be secured to the truck frame member 13, and the bolts 23 of the wheel assembly will be tightened to draw the wheel discs 19, 20 together to bind the entire assembly including the axle 11 into an integral unit. Thus, a series of independent elements is readily assembled at the truck to form a complete and effective wheel.

When it becomes necessary to replace the tire A, the process of assembly will be reversed. All of the binding forces will be relieved merely by loosening the bolts 23 and tapping one of the disks to release the wedging action. Since the sleeve 24 will then tend to contract, the tire rim 18 may be very easily slipped therefrom.

Figure 4:
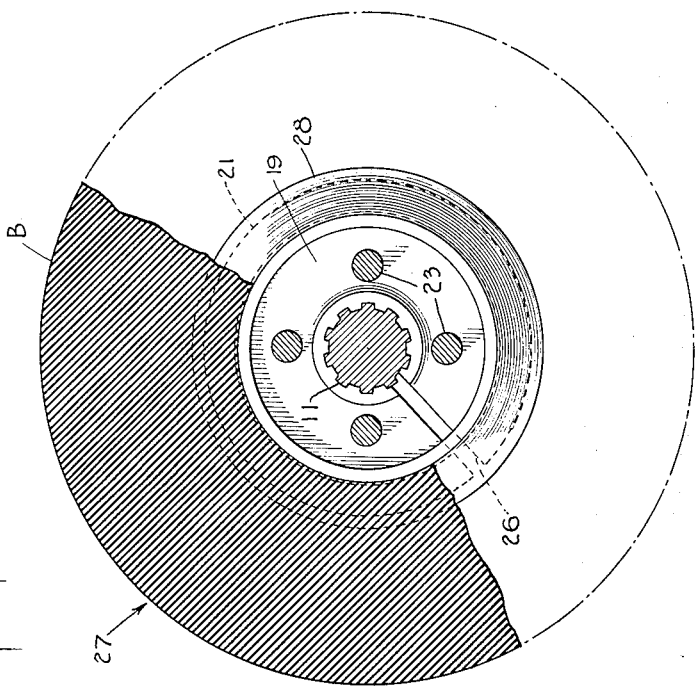
Fig. 4 is a cross-sectional view of the same taken on the line 4—4 of Fig. 3, a portion of the tire being omitted in the interest of clarity.

While my invention has been described thus far as being adapted for mounting a tire that is attached to a cylindrical rim, it may also be adapted to advantage for mounting a tire of the so-called demountable type, in which the tire is not permanently vulcanized to the rim, and the inner periphery of the tire is in the form of two frusto-conical surfaces the smaller diameters of which are located toward the center of the tire. Such an adaptation of my novel wheel assembly, in which a tire B is mounted, is indicated generally by the numeral 27 in Figs. 3 and 4. In this assembly, the binding effect of the wheel members or discs 19, 20 is produced by drawing them toward each other on the axle 11 in the same manner as has been described. However, since the tire B has conical inner surfaces and is not itself provided with a rim, the wheel assembly 27 includes a rim that is made up of a pair of complementary tapered sleeve sections 28, 29, encircling the wheel discs 19, 20.

The wedging action of the inclined flanges 21, 22, of the wheel discs is against the inner surfaces of the sleeve sections 28, 29, and this wedging action is transferred through the sleeve sections to the conical inner surfaces of the tire, whereby to bind the tire securely into place in the assembly. This is made possible by the fact that the sleeve sections 28, 29, abut each other at their smaller diameters, thereby rendering the wedging action effective when the wheel discs 19, 20, are drawn toward each other.

Also, the inner diameter of the tire B is slightly smaller than the diameters of the sleeve sections 28, 29, so as to have firm engagement with the sleeve sections when the latter are wedged together. It is also important to note that the sleeve sections 28, 29, are continuous rings and are not split, thereby positively confining the wheel discs 19, 20, so that they may efficiently grip the axle 11 through their wedging action. This feature further operates to limit the outward radial forces upon the tire B, thereby avoiding any excessive expanding effect upon the tire.

The wheel assembly 27 may be installed upon and removed from the axle 11 through substantially the same procedure that is used in installing the wheel assembly 10, since the loosely assembled parts may readily slide longitudinally upon the axle 11 when the bolts 23 are in a loose condition. Of course, in this form of the invention, the inner surface of the tire B is not cylindrical and it will be necessary to remove at least one of the wheel discs 19, 20, completely from the assembly in order to permit removal of the tire from the remainder of the assembly.

It is believed that the important advantages of my novel wheel assembly will now be apparent from the foregoing description.

I now claim:

A ground contacting truck wheel assembly comprising a splined axle, spaced bearing means mounting said axle in spaced frame members for rotation therebetween and adapted to release said axle for removal, a wheel rim and a pair of independent complementary wheel discs adapted for rotation with said axle on said bearing means and adapted to drop downwardly from between said frame members when said axle is released from said bearing means, each of said wheel discs having a central splined opening whereby to slide relatively to the other disc on the spline of the axle, the splined part of each disc extending a substantial distance in an axial direction on said spline of the axle and holding the wheel disc in aligned relation to the other disc on the axle and against rotation relatively to the axle, each of said wheel discs formed with a slot extending from its central splined opening to its periphery whereby each disc is compressible relatively to the spline of the axle to lock both discs against sliding on said axle spline, said wheel rim encircling both of the wheel discs and fitted against the outer periphery of each disc, coacting wedging surfaces on the wheel rim and each wheel disc, threaded means between said discs acting independently of said wheel rim to draw the wheel discs toward each other on the spline of the axle, said wheel rim acting through said wedging surfaces when the wheel discs are thus drawn toward each other to compress both discs upon the spline of the axle with the spline holding the discs in aligned relation and against rotation relatively to each other and the axle, whereby to assemble the wheel discs and wheel rim to said axle in a position between the frame members.

References Cited in the file of this patent

UNITED STATES PATENTS

| | | |
|---|---|---|
| 202,992 | Clark | Apr. 30, 1878 |
| 1,702,647 | Gammeter | Feb. 19, 1929 |
| 1,795,659 | Martin | Mar. 10, 1931 |
| 2,460,631 | Fawick | Feb. 1, 1949 |
| 2,495,952 | Allman | Jan. 31, 1950 |
| 2,524,027 | Blackmarr | Oct. 3, 1950 |

FOREIGN PATENTS

| | | |
|---|---|---|
| 137,555 | Great Britain | Jan. 22, 1920 |
| 412,691 | Great Britain | July 5, 1934 |

OTHER REFERENCES

Kasper: American Machinist, October 11, 1945, page 133.